United States Patent Office 3,749,604
Patented July 31, 1973

3,749,604
HEAT RESISTANT SUBSTRATES AND BATTERY SEPARATORS MADE THEREFROM
Alois Langer, Pittsburgh, Luciano C. Scala, Murrysville, and Charles R. Ruffing, Pittsburgh, Pa., assignors to Westinghouse Electric Corporation, Pittsburgh, Pa.
Filed Mar. 12, 1970, Ser. No. 19,009
Int. Cl. H01m 3/02
U.S. Cl. 136—20    5 Claims

ABSTRACT OF THE DISCLOSURE

A flexible substrate having a caustic resistant support and at least one membrane comprising a solid polymeric matrix containing a network of interconnected pores and interdispersed inorganic filler particles with a ratio of filler: polymer in the polymeric matrix of between about 1:1 to 5:1, is made by coating at least one side of the support with a filler:coating formulation mixture of inorganic filler particles and a caustic resistant, water insoluble polymer dissolved in an organic solvent, and removing the solvent from the mixture to provide a porous network within the polymeric matrix.

---

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The alkaline silver oxide-zinc secondary battery is of very great interest because of its potentially high watt-hour per pound output. However, the practical application of this battery has been limited by its short cycle life. This drawback is generally ascribed to separator failure. Specifically, short battery life is attributed to transfer of silver oxide from plate to plate and to the growth of highly branched zinc dendrites, which can cause short circuits in the battery.

The regenerated cellulosic separators in current use are incapable of withstanding degradative effects (oxidation and hydrolysis) and of preventing silver ion passage through them for a sufficiently long service time.

The oxides of silver are soluble in the potassium hydroxide electrolytes generally used in silver oxide-zinc batteries. For this reason, silver can be transferred to the zinc plate. This is undesirable because it gives rise to local cell action which brings about the self discharge of the active material on the zinc electrode. Silver oxide can also degrade separator material and form metal deposits on and in the separator, which may form metallic paths between electrodes subjecting them to internal short circuits.

When zinc is plated out of alkaline zincate solutions in the charging process, such as may occur at high current densities in silver oxide-zinc batteries, the deposit can form numerous highly branched, dendritic structures. These may enter and grow through the battery separators causing catastrophic shorting or excessive self-discharge.

To solve these problems, new separator materials must be found. Some of the desirable characteristics would include (1) the ability to prevent the transfer of silver oxides through the material, (2) a structure in which silver would not readily deposit or degrade and (3) a structure which would prevent catastrophic dendritic shorting. In addition, the battery separator must be permeable to the transport of $K^+$ and $OH^-$ electrolyte ions, have a low electrical resistance and be electronically insulating.

Other separator materials such as methylcellulose, polyvinyl alcohol, polyethylene acrylic acid graft polymers, and chemically grafted polyethylene have not satisfied all of the above requirements, which are necessary to improve battery output.

If, in addition to ordinary service, the silver oxide-zinc battery is expected to withstand relatively high temperatures, of the order of 120–135° C., such as might occur during the kind of sterilizing cycles contemplated in the case of batteries for interplanetary space flights, then the battery separator, already the weak link of the battery system, becomes even more susceptible to serious damage.

There is a need, therefore, for a separator material able to perform better than the cellulosic and other type prior art separators and, in addition, be capable of withstanding the prolonged exposure to high temperature while immersed in caustic solution.

SUMMARY OF THE INVENTION

We have found that battery separators able to withstand sterilizing cycles involving heating at 135° C. in 40 percent KOH and which essentially prevent silver ion flow and resist concentrated, highly branched zinc dendrite penetration, can be fabricated using a continuous dip process.

This is accomplished by coating at least one side of a flexible, porous support, resistant to caustic solutions, with a mixture of an alkali resistant, water insoluble polymer, inert inorganic filler particles and a water soluble organic solvent. Once the mixture is applied to the support, the solvent still present in the composite is removed, preferably leached out by immersing the composite in a water-acid or water-organic solvent extracting solution. This action results in the formation of very small pores throughout the polymeric matrix which will allow $K^+$ and $OH^-$ electrolyte ions to pass through; simultaneously the aqueous treatment precipitates out and solidifies the polymer from the deposited mixture onto the porous support. The removal of the residual water and solvent from the treated composite by means of a modest heat treatment finally results in a heat resistant porous substrate, consisting of a central support layer coated over with a rubbery, solid, porous mixture of KOH-resistant polymer and inorganic filler particles.

BRIEF DESCRIPTION OF THE DRAWINGS

For a better understanding of the invention, reference may be had to the preferred embodiments, exemplary of the invention, shown in the accompanying drawings in which.

DESCRIPTION OF THE PREFERRED EMBODIMENTS

Figure 1:
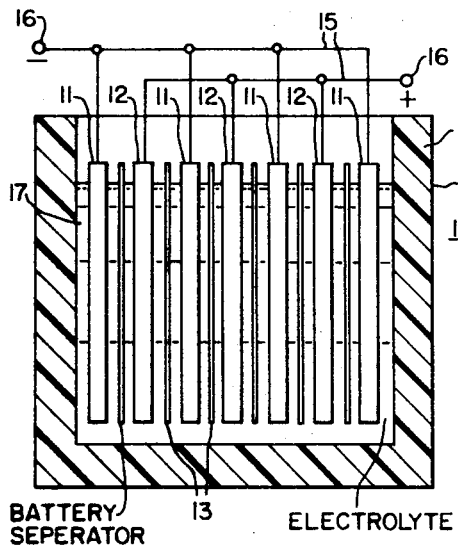
FIG. 1 shows an electrochemical cell such as a battery utilizing the substrate of this invention as an improved battery electrode plate separator.

Referring now to FIG. 1 of the drawings, an electrochemical cell such as a battery 10 is shown consisting of a plurality of negative electrode plates 11 and positive electrodes plates 12, with flexible battery separators 13 therebetween or wrapped around an electrode, all housed in container 14, which may be provided with a cover, lead wires 15, terminals 16 and also contain a suitable electrolyte 17, contacting the electrode plates and separators.

Although the description herein is primarily drawn to the silver oxide-zinc secondary battery, where the positive plates 12 comprise silver or silver oxide plates and the negative plates 11 comprise zinc plates, other electrodes are envisioned for use with the battery separators 13 of this invention. For example, the positive plates 12 may comprise nickel, nickel oxide, lead oxide or mercury oxide plates among others and the negative plates 11 may comprise iron or cadmium plates immersed in a suitable electrolyte such as aqueous NaOH or KOH.

In a silver oxide-zinc battery, the positive plates generally have thicknesses in the range of 20 to 50 mils and may be produced by sintering a pasted oxide, silver powder, or silver powder-polymer mixture to an expanded silver grid. They may also be produced by pasting silver oxide to silver foil or impregnating sintered carbonyl nickel plaques with silver compounds. Further reference may be made to U.S. Pat. No. 3,282,732 for a complete description of making a silver oxide electrode.

The zinc negative plates are generally the same thickness as the positive plates. Zinc may be deposited on a metal grid in a spongy form and the plate compressed to the desired thickness or the zinc plate may be made by pasting a zinc oxide with various admixtures such as mercuric oxide and a polymeric binder on an expanded copper or zinc grid and pressing to size. Further reference may be made to U.S. Pat. No. 3,003,015 for a complete description of making a zinc electrode.

The anodic oxidation of silver in alkaline solutions is basically a two-step process. First, a layer of monovalent $Ag_2O$, silver (I) oxide, is produced on the silver plate. When this layer reaches a critical thickness, mass transfer of oxygen ions to the $Ag$-$Ag_2O$ interface becomes slow, and the oxidation of $Ag_2O$ to divalent AgO, silver (II) oxide begins at a higher potential level. Further anodization leads to the evolution of oxygen.

The anodic or discharge process at the zinc electrode involves zinc being oxidized to solid ZnO or $Zn(OH)_2$ at the interface. The ZnO or $Zn(OH)_2$ dissolves in the electrolyte to eventually yield $Zn(OH)_4^{2-}$, zincate ions. The electrolyte becomes saturated with zincate and a ZnO or $Zn(OH)_2$ film forms on the surface of the electrode.

The overall cell reaction has been written in various ways, one of which is the following:

$$2AgO + Zn + H_2O = Ag_2O + Zn(OH)_2$$

$$Ag_2O + Zn = 2Ag + ZnO$$

$$2AgO + 2Zn + H_2O = 2Ag + ZnO + Zn(OH)_2$$

where the reaction in the forward direction (left to right) represents the discharge direction and in the reverse direction (right to left) represents the charge direction.

The electrolytes most commonly used in the battery systems of this invention are aqueous solutions (10 to 50 weight percent) of NaOH but preferably KOH.

A proper separator in a heat sterilizable silver oxide-zinc secondary battery should perform several functions satisfactorily after being subjected to heat sterilization treatment. Among these are the following:

(1) It must prevent direct contact between the positive and negative electrodes to avoid internal discharge. The separator must therefore remain a good electronic insulator.

(2) It should allow a high degree of ionic conduction when soaked with the electrolyte to minimize the internal IR drop of the battery at high discharge and charge rates and to assure high efficiency in utilization of the active components.

(3) It should retard to some degree the free diffusion of some of the soluble complexes formed, notably of Ag, to prevent migration to and deposition on the Zn electrode. A certain amount of Zn diffusion must be maintained to assure capacity of the cell.

(4) The separator should retard highly branched dendritic growth of the Zn in the charging cycle, so that the zinc dendrites cannot reach the opposite electrode, causing internal shorts and loss of active material.

The separator material must be stable against the degrading influence of higher silver oxides during and after exposure to several heat cycles at 135° C. for 60 hour duration while in contact with the 40% KOH electrolyte, so that it will still perform the above functions. Among its other required properties, the barrier should have and maintain satisfactory mechanical strength to prevent tearing. It should be flexible so that it is useful in a variety of applications, mainly to be wrapped over the negative electrode in an electrochemical cell, and must be free from imperfections, such as large pinholes and cracks.

In order to meet the above mentioned performance requirements we modified polymeric matrix materials which had satisfactory stability in the required environment by incorporation of inorganic ion exchange type filler materials stable under the same conditions.

Figure 2:
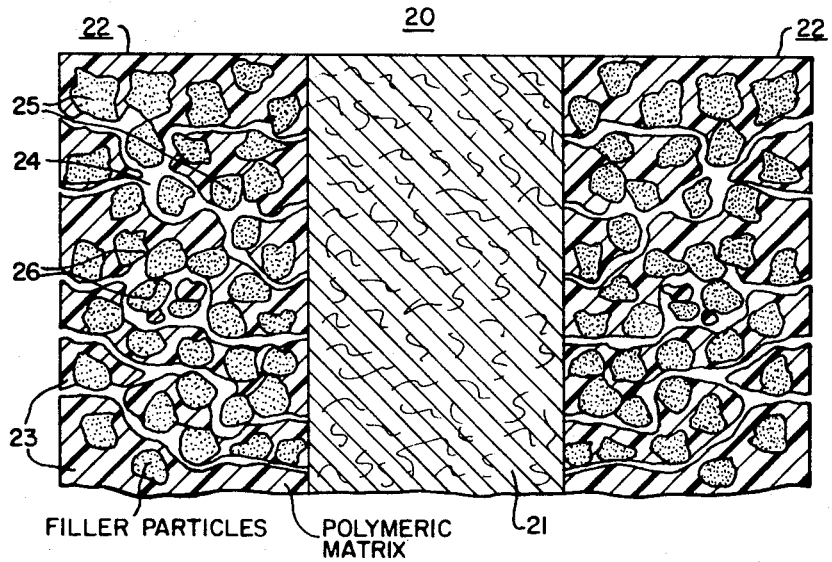
FIG. 2 shows a fragmented sectional view of the porous substrate of this invention.

Referring now to FIG. 2, an enlarged fragmented sectional view of the flexible porous substrate of this invention is shown as 20. This flexible porous substrate 20 consists of a flexible, caustic resistant, porous support 21 preferably of polymeric fibrous material. This support can be a layer of woven, felted, or nonwoven polymeric material and must be resistant to attack by concentrated caustic solutions, at room temperature, and at 135° C. for high temperature applications. It must be porous and will generally vary in thickness from about 1.5 to 10 mils (0.0015 to 0.010"). Suitable polymeric support tape materials for room temperature applications include aromatic amine cured epoxides, polyphenylene oxides, polysulfones, polytetrafluoroethylene and polypropylene fabrics. The material we found especially suitable for high temperature battery separator applications was polypropylene. These fabrics should not contain large and irregular voids as this may contribute to pinholes in the final product. The fabric porosity can range from medium to microporous. For best results in terms of electrolyte flow, the fabric (polypropylene, etc. about 4 mils thick) should weigh between about 15 to 95 grams per square yard, with a preferred weight of between 25 to 65 grams per square yard. Medium porosity would be equivalent to about 25 grams per square yard.

The membrane 22 is in contact with and attached to at least one side and preferably both planar surfaces of the central support 21 as shown in FIG. 2. The membrane 22 consists of a solid polymeric matrix 23 containing a network of a large number of interconnted pores 24 and indispersed, generally contacting, inorganic filler particles 25. The pores should be evenly distributed throughout the polymeric matrix and are of varying minute diameter. The pores may vary in size and are generally less than 75 microns diameter with a preferred diameter between about 5 to 50 microns. The membrane thickness may vary from about 1 to 10 mils.

The inorganic filler materials preferably have very limited solubility in 8 M (40 percent) aqueous KOH solution. Suitable fillers for room temperature applications (about 25° C.) include inorganic fillers such as zirconium phosphate, calcium zirconate, strontium zirconate, magnesium zirconate, zinc zirconate, calcium stannate, strontium stannate, barium stannate, calcium oxide, aluminum oxide, barium arsenate, magnesium stannate, silica, fused quartz, aluminum silicate, beryllium aluminum silicate, and lithium aluminum silicate among others.

Preferred inorganic ion exchange fillers for room temperature applications include hydrated zirconia ($ZrO_2$) hydrous zirconium oxide $Zr(OH)_4$, zeolites (hydrated silicates of aluminum and calcium of the type $$Na_2O \cdot Al_2O_3 \cdot nSiO_2 \cdot xH_2O)$$

barium zirconate ($BaZrO_4$), titanium oxide ($TiO_2$), stannic oxide ($SnO_2$), thorium oxide ($ThO_2$) and magnesium oxide (MgO). For high temperature battery separator applications (about 135° C.) we found hydrous zirconium oxide and zeolites to be the preferred fillers.

We found that the particle size of the inorganic filler particles can vary between about 200 to 20 mesh (0.003 to 0.032" or 74 to 700 microns) i.e. most of the filler particles would pass through a 0.032" diameter sieve opening but not through a 0.003" diameter sieve opening. The preferred particle size range can vary between 100 to 20 mesh (0.0058 to 0.032" or, 149 to 700 microns).

The polymeric binder that forms the polymeric matrix 23 should be insoluble in water and resistant to attack by aqueous 40 percent KOH at room temperature, and preferably also at 135° C. for high temperature battery separator applications. Suitable polymeric materials well known in the art for room temperature applications include polyphenylene oxide, polyvinylidene fluoride, phenoxy and polysulfone. The binder we found most suitable for both room and high temperature battery separator applications was polysulfone.

These polymeric materials are applied to the porous support tape in the form of a filler:coating formulation mixture. The polymeric binder materials are in solution with a suitable water soluble organic solvent such as n,n dimethylformamide, tetrahydrofuran, or dimethylacetamide. The weight ratio of polymeric binder to solvent can vary between about 1 part binder:10 parts solvent, to 1 part binder:5 parts solvent to give suitable coating formulations. The weight ratio of filler particles to polymeric binder in the mixture can vary between 1 part filler:1 part polymeric binder, to 5 parts filler:1 part polymeric binder, with a preferred range of 2–3.5 parts filler:1 part polymeric binder. The polymeric binder makes up the polymeric matrix of the membrane. The filler:coating formulation may also contain a small amount of a suitable wetting agent.

The manner in which the membrane of the substrate acquires its porosity is envisioned as being a result of capillary extraction of the water soluble organic solvent originally present in the coating formulation (polymeric binder plus solvent), by an extracting solution. A simultaneous effect of immersion in an extracting bath is the coagulation of the water insoluble polymeric binder to give a rubbery polymeric coating on the supporting tape which appears continuous to the naked eye. The porosity is largely dependent on the type, particle size and loading of filler used. The filler is chosen to act both as a reinforcing agent and as porosity foci.

Initially, the filler:coating formulation mixture has a jelly like consistency. It can be air dried to eliminate the solvent, but a liquid extracting process is faster and produces a more uniform membrane structure. Generally, a high filler loading is preferred (about 3 parts filler to 1 part polymer) to provide a large number of filler particle contact points, shown as 26 in the two dimensional illustration of FIG. 2. When the membrane is immersed in a suitable extracting liquid, the water insoluble polymeric binder is precipitated out of solution to form a membrane film while the solvent is leached out of the contracting and solidifying membrane by capillary action through the mass of contacting filler particles. The resulting membrane has a rubbery consistency with minute pores around the interdispersed filler particles.

The filler:coating formulations generally used consisted of 3 parts of 20 to 50 mesh refractory oxide filler, to 1 part polysulfone resin. The filler:coating formulation mixture should be thoroughly ball mill mixed e.g. for about three days, before use. Wetting agents can be added to improve adhesion of the filler:coating formulation mixture to the porous support and to provide a smoother membrane coating. They can be added between about 0.5 to 2 weight percent of the filler:coating formulation; based on the solid weight of filler and polymeric binder. Useful wetting agents would include cationic, low molecular weight substituted oxazolines such as those sold under the trade name Alykaterge.

Extraction of the solvent from the polymeric binder to form a network of a plurality of interconnected fine pores within the resin matrix of the membrane was generally accomplished in water-dimethylacetamide, water-dimethylsulfoxide, water-diethylene dioxide (1,4 dioxane) and water-acetic acid extracting solutions, although an all water solution or an all organic solvent could be used. Good results were achieved in extracting solutions having 1 part by volume water:3 parts by volume organic solvent, to 3 parts by volume water:1 part by volume organic solvent. The dioxane containing extracting solutions, especially the ones in which the dioxane (diethylene dioxide) is the preponderant ingredient, yield battery separator composites which have shown the best resistivity and ion diffusion values. This indicates that the pore size and pore distribution within the membrane of the substrate are fairly uniform. The time of immersion in the water:organic solvent extracting solutions does not seem to be a very important factor. This may be due to the fact that the coagulation of the polymeric binder and solvent leaching actions are fast and simultaneous. The leaching period should be followed by modest heating in a furnace or tower.

Figure 3:
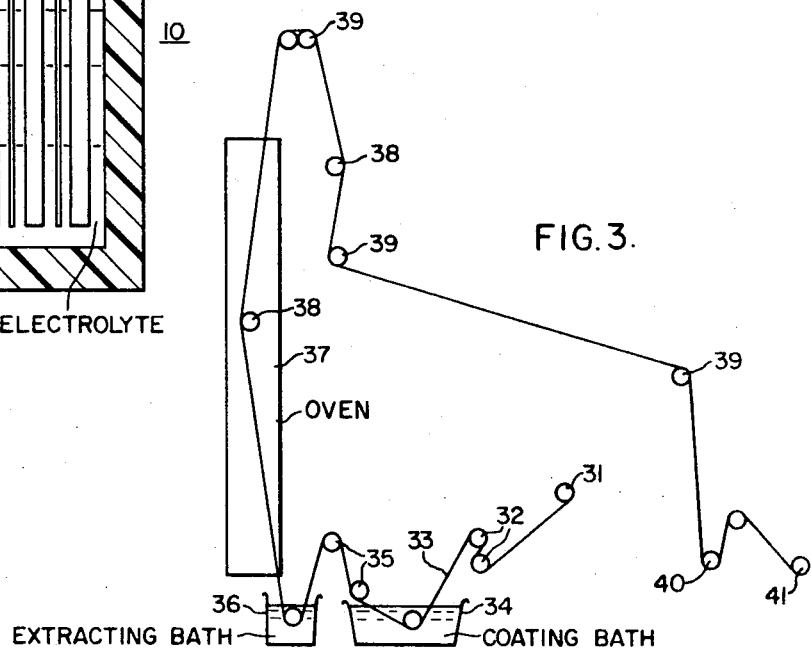
FIG. 3 is a diagram showing one method of fabricating the substrates of this invention by a continuous dip coating process.

The filler:coating formulation mixture can be applied to one or both sides of the porous support by any suitable means, as for example, with a knife applicator. The preferred method of application of the membrane however, is shown in FIG. 3. Such a continuous dip coating method would be particularly useful in the commercial manufacture of our substrates. Free rolling pay off support tape roll 31 is driven by two driving rollers 32. The flexible support tape 33 is dipped in the coating bath 34 containing the stirred filler:coating formulation mixture and runs between two 1-inch Teflon wiper rods 35. The wiper rods insure better penetration into the tape interstices and remove excess mix. The filler:coating formulation mixture should be thoroughly mixed, for example in a ball mill, to insure homogeneous dispersion of the filler particles and should be stirred during the dipping operation so that the filler will not tend to settle out. The coated tape subsequently proceeds over the top wiper rod at a very sharp angle, down into an agitated extracting bath 36, containing usually a water-organic extracting solution. It then proceeds through an oven 37, past Teflon (polytetrafluoroethylene) spreading rods 38, guiding rollers 39, capstan drive wind up roller 40 and on to the take up roll 41.

The oven temperature can vary between about 60–85° C. and for a line speed of 2–10 ft./min. the oven should be about 10–20 ft. long. Oven temperatures over 80° C., at speeds of about 3–5 ft./min. tend to make the coated tapes shrink and/or curl and may cause meting of the fibrous support tape. A method such as that shown in FIG. 3 is capable of providing continuous 12" wide porous substrates.

Example 1

A filler:coating formulation mixture, containing 720 grams of vacuum oven-dried 20–50 mesh hydrated zirconia filler particles, 1840 grams of a polysulfone-dimethylacetamide coating solution (having a weight ratio of 15 parts resin binder to 100 parts solvent), and 9.6 grams (1%) of a cationic low molecular weight substituted oxazoline wetting agent (solid under the trade name Alkaterge E by Commercial Solvents Corp.) were ball milled for five days to insure homogeneous mixture. The filler:resin binder weight ratio was 3 to 1. The polysulfone was a linear aromatic thermoplastic resin consisting of phenylene units linked by isopropylidene, ether and sulfone groups sold commercially as Union Carbide P1700 Bakelite polysulfone extrusion and molding compound.

A one foot-wide, non-woven 3.5 mil thick polypropylene support weighing 30 grams per square yard (Webril tape EM476, supplied by Kendall Fiber Co ) was fed from a pay off roll into a dip coating bath containing the above described filler:coating formulation mixture, as shown in FIG. 3 of the drawings. The coated support tape was then passed into an extracting bath containing by volume 2 parts (gallons) water:4 parts (gallons) 1,4 dioxane (diethylene dioxide), where the water insoluble polysulfone resin solidified into a rubbery mass and the aqueous extracting solution leached out most of the water soluble dimethylacetamide solvent. The coated support tape was then fed through a 12 foot high vertical oven operating at 75–80° C. as shown in FIG. 3 of the drawings. The line speed of the tape was six feet per minute. The resulting dry composite tape, about 7 mils thick, was wound onto a takeup roll. This substrate was porous and pinhole-free.

Several 2" x 1.5" samples of the substrate were cut from the takeup roll. They were placed in stainless steel cups lined with Teflon and containing 8 M (40 wt. percent) aqueous KOH solution. The cups were sealed with Teflon washers and steel covers held by C clamps. The cups containing the samples in KOH were then sterilized in a metal box containing sand in a 135° C. oven for 60 hours.

The battery separator material withstood sterilization without losing its physical or electrical properties. Weight loss was about 10 percent and the thickness of the samples seemed relatively unchanged. The specific resistivity of the separator material was of the order of 40 ohms-inch before sterilization cycling and about 20 ohms-inch after sterilization. Acceptable resistivity values are considered to be below 60 ohms-inch.

These porous battery separator substrates were then tested to polarographically measure the flow of silver ions through them as a function of time. The instrument used was a Heath built polarograph, Model EUW–402 M, employing a dropping mercury electrode as the working electrode and a massive external mercury-mercuric oxide electrode (in 40% KOH) as the reference and counter electrodes. A saturated silver solution was prepared by dissolving silver nitrate in 40% KOH. Measurements were carried out continuously over a period of about 30 to 60 hours. Each membrane sample was placed between two Teflon cells, one containing the known Ag solution in 40% KOH and the other containing only 44% KOH. The runs were made under a blanket of $N_2$ to prevent formation of potassium carbonate. Silver ion flow through our battery separator was almost negligible, the worst case being less than 4 parts per million after about 50 hours exposure to the saturated KOH-Ag solution. In addition, the samples did not appear to be especially degraded.

Zincate ion diffusion through the separators was measured using flame adsorption spectroscopy. The apparatus consisted of two Teflon cups (2" I.D., 100 cc vol.) each with a flat face. A hole (½" diam.) was drilled in each flat face, a square of separator to be tested was placed between the holes, and the cups clamped together. One cup was filled with 40% KOH and the other cup filled with 40% KOH containing 40 p.p.m. zinc ions. Samples of 1 cc. were taken at regular intervals and the zinc concentration measured by flame absorption spectroscopy. The samples tested had previously been tested for silver ion diffusion. The results showed that the rate of zincate ion diffusion was of the same order as silver ion diffusion, with a maximum of 4.2 p.p.m. after 50 hours.

The electrolyte flow through the battery separator was very fast; this was indicated by the rapid passage of KOH molecules through it as shown by pH measurements as functions of time of exposure to 40% KOH at 26° C. by the separator. The results showed an increase in pH units from about 6.5 to 12 in about two minutes.

The substrates produced were flexible, prevented rapid transfer of silver oxides through the materials, were not easily degraded, allowed transport of K+ and OH− electrolyte ions easily, were structurally sound and had a low electrical resistance. They were uniquely suitable as high temperature separators for use in electrochemical cells since they withstood very vigorous sterilization cycles at 135° C. in 40% KOH.

These substrates have been used in silver oxide-zinc cells with very high initial efficiency. A comparison of zinc dendrite growth was made between our polysulfone-refractory oxide battery separator and a multiple layer cellophane battery separator. It could be observed microscopically that the zinc dendrites did not pierce our separator but grew into and inside of the structure. In the cellophane separator, the growth was at many points and the dendrites were relatively broad and highly branched. In our porous filled membrane, although there was zinc dendrite penetration, it was usually only at a few points, and the dendrites were thin and hardly noticeable.

Example 2

Two filler:coating formulation mixtures containing 20–50 mesh hydrated zirconia filler particles, and polysulfone-dimethylacetamide coating solutions (having a weight ratio of 15 parts resin binder to 100 parts solvent) were ball milled for five days to insure homogeneous mixtures. The filler:resin binder weight ratio in one mix was 2 to 1 and in the other 4 to 1.

Continuous dip coating runs were made on nonwoven 3.5 mil thick polypropylene support tape according to the procedure outlined in Example 1 and illustrated in FIG. 3 of the drawings, except the coating speed varied from 5 to 7 feet per minute.

The resulting battery separators withstood the sterilization step described in Example 1 and exhibited satisfactory specific resisitivities, electrolyte flow and silver ion impermeability.

Example 3

Four filler:coating formulations containing filler and polysulfone-dimethylacetamide coating solutions (having a weight ratio of 15 parts resin binder to 100 parts solvent) were ball milled for five days to insure homogeneous mixtures. The filler:resin binder weight ratio in all mixtures was 3 to 1. The fillers used were:

(1) 20–50 mesh zeolite filler, a hydrated silicate of aluminum and calcium of the type

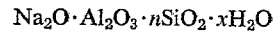

$$Na_2O \cdot Al_2O_3 \cdot nSiO_2 \cdot xH_2O$$

(sold under the trade name Zeolon H by Norton Company).

(2) 20–50 mesh titanium oxide ($TiO_2$)
(3) 20–50 mesh stannic oxide ($SnO_2$) and
(4) 20–50 mesh thorium oxide ($ThO_2$).

Continuous dip coating runs were made on nonwoven 3.5 mil thick polypropylene support tape according to the procedure outlined in Example 1 and illustrated in FIG. 3 of the drawings with a coating speed of six feet per minute.

The resulting battery separators withstood the sterilization step described in Example 1 and exhibited satisfactory specific resistivities, electrolyte flow and silver ion impermeability.

We claim:

1. An electrochemical cell having positive and negative electrode plates with a caustic resistant separator therebetween housed in a container which is provided with positive and negative terminals and with a caustic electrolyte contacting the electrode plates and separators, wherein the separators comprise a caustic resistant flexible porous support, at least one side of which is in contact with a membrane consisting essentially of caustic resistant polymers, forming a solid polymeric matrix containing a network of a plurality of interconnected pores having diameters between about 5 to 75 microns, and interdispersed caustic resistant inorganic filler particles having a particle size diameter between about 74 to 700 microns, wherein the weight ratio of filler:polymer in the polymeric matrix ranges from 1:1 to 5:1.

2. The electrochemical cell of claim 1 wherein the support in the separator is a fibrous polymeric support selected from the group of polymeric materials consisting of aromatic epoxides, polyphenylene oxides, polysulfones, polytetrafluoroethylene and polypropylenes, there are a large number of filler particle contact points in the polymeric matrix and the polymer in the polymeric matrix of the separator is selected from the group consisting of polyphenylene oxide, polyvinylidene fluoride, phenoxy and polysulfone.

3. The electrochemical cell of claim 2 being heat sterilizable wherein the polymeric support is between about 1.5 to 10 mils thick, the membrane is between about 1 to 10 mils thick, the inorganic filler particles are selected from the group consisting of hydrated zirconia, hydrous zirconium oxide, zeolites, barium zirconate, titanium oxide, stannic oxide, thorium oxide and magnesium oxide, the electrolyte is selected from the group consisting of aqueous KOH and NaOH, the positive electrode plate comprises a material selected from the group consisting of silver and silver oxide and the negative electrode plate comprises zinc.

4. The electrochemical cell of claim 2 wherein the electrolyte is selected from the group consisting of aqueous KOH and NaOH, the positive electrode plate comprises nickel and the negative electrode plate comprises a material selected from the group consisting of iron and cadmium.

5. The electrochemical cell of claim 2 wherein the separator is wrapped around the electrode plates.

References Cited

UNITED STATES PATENTS

| | | | |
|---|---|---|---|
| 3,542,596 | 11/1970 | Arrance | 136—146 |
| 3,450,571 | 6/1969 | Zenczak | 136—145 |
| 2,653,985 | 9/1953 | Philipps | 136—145 |
| 3,238,056 | 3/1966 | Pall et al. | 136—145 |
| 3,625,771 | 12/1971 | Arrance et al. | 136—145 |
| 3,226,260 | 12/1965 | Drengler | 130—30 |

DONALD L. WALTON, Primary Examiner

U.S. Cl. X.R.

136—145, 146